United States Patent

[11] 3,593,136

[72] Inventors Frederick W. Chapman
 Birmingham;
 Frank E. Jamerson, Troy; Nils L. Muench,
 Bloomfield Hills, all of, Mich.
[21] Appl. No. 857,135
[22] Filed Sept. 11, 1969
[45] Patented July 13, 1971
[73] Assignee General Motors Corporation
 Detroit, Mich.

[54] SENSING ROTATIONAL SPEED BY AMPLITUDE MODULATING A CONTINUOUS MICROWAVE SIGNAL
 1 Claim, 1 Drawing Fig.
[52] U.S. Cl. .................................................. 324/175,
 324/58.5
[51] Int. Cl. .................................................. G01p 3/36
[50] Field of Search .......................................... 324/69, 70,
 58, 58.5

[56] References Cited
 UNITED STATES PATENTS
 3,156,115 11/1964 Adelmann .................... 324/70 UX
 3,395,342 7/1968 Pounds ......................... 324/70
 OTHER REFERENCES
 A. H. Ryan and S. D. Summers - "Microwaves Used To Observe Commutator And Slip Ring Surfaces During Operation"
 — ELECTRICAL ENGINEERING - March, 1954, pp. 251—255.

Primary Examiner—Michael J. Lynch
Attorneys—Jean L. Carpenter and Paul Fitzpatrick ABSTRACT: A rotating member speed sensor in which microwaves are beamed toward the rotating member so as to be reflected from a surface of the rotating member to a detector. The surface of the rotating member has grooves therein so as to amplitude modulate the beamed microwaves such that the reflected microwaves as sensed by the detector have a frequency of modulation corresponding to the speed of rotation of the rotating member.

PATENTED JUL 13 1971　　3,593,136
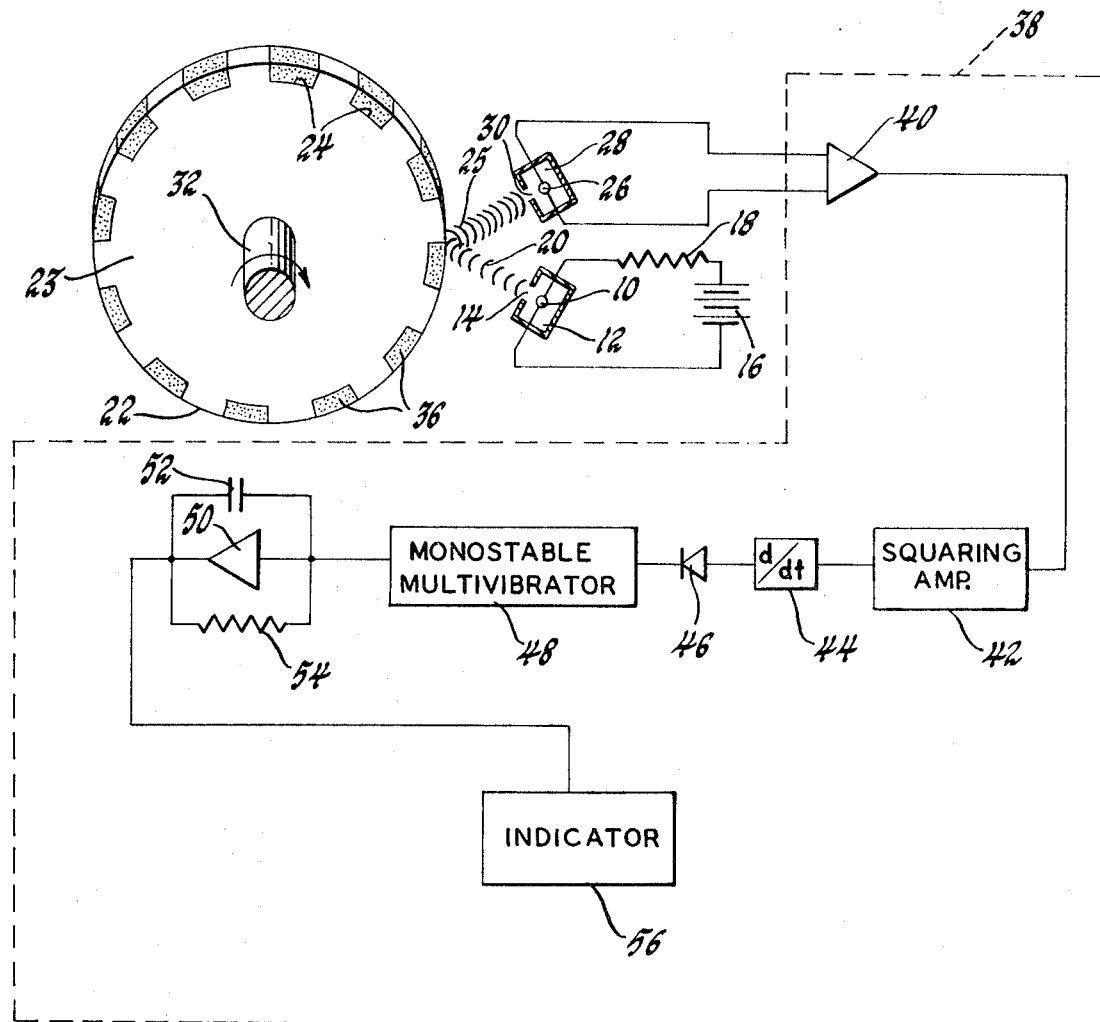
INVENTORS
Frederick W. Chapman,
BY Frank E. Jamerson &
Nils L. Muench
Paul Fitzpatrick
ATTORNEY

SENSING ROTATIONAL SPEED BY AMPLITUDE MODULATING A CONTINUOUS MICROWAVE SIGNAL

This invention relates to a rotating member speed sensor and more specifically to a rotating member speed sensor utilizing the amplitude modulation of a reflected microwave signal from a grooved surface on the rotating member to sense the speed of rotation of the rotating member.

Some present rotating member speed sensors utilize a magnetic pickup which senses the change in the magnetic reluctance of a gear with external teeth. The spacing between the gear and the magnetic pickup is very critical and requires that the pickup be precisely located with respect to the gear. Therefore, the handling of the gear during production is critical. In addition, the signal amplitude of such sensors is a function of speed, the amplitude being low at low speeds and increasing with higher speeds.

It is one object of this invention to provide for a rotating member speed sensor utilizing microwaves.

It is another object of this invention to provide for a rotating member speed sensor in which the amplitude of the output signal is independent of speed.

It is another object of this invention to provide for a rotating member speed sensor in which the spacing between the sensor and the rotating member is relatively large and less critical.

Due to the development of solid state microwave generators and detectors, such devices are now small and are potentially inexpensive. As a result, microwave generators and detectors may be utilized for purposes where space and cost previously prohibited their use or for entirely new uses.

The foregoing objects of this invention are accomplished by the utilization of microwaves as the sensor of the rotation of a rotating member. When microwaves are reflected from a surface, the amplitude of the reflected signal is a function of the distance between the source of the microwaves and the detector of the microwaves. For a microwave reflector whose spacing from the microwave generator varies in time, an amplitude modulation of the reflected microwave signal will be generated at a frequency corresponding to the frequency variations of the spacing. Therefore, the rotation of a rotating member can be sensed by beaming microwaves so as to reflect from a grooved surface on the rotating member so as to amplitude modulate the beamed microwaves and sense the reflected modulated microwaves and utilize the frequency of modulation to determine the rotation of the rotating member.

In the preferred embodiment as hereinafter discussed, the microwave rotating member speed sensor is utilized to determine the speed of rotation of a grooved disc. It is understood that the microwave rotating member speed sensor is not limited thereto, but may be utilized to sense the rotation of any rotating member such as a gear having a surface which varies the distance through which microwaves must travel between a microwave generator and a microwave detector or a brake drum having a grooved surface.

The invention may be best understood by reference to the following detailed description of a preferred embodiment when considered in conjunction with the accompanying drawing which is a schematic drawing of the preferred embodiment of this invention.

Referring to the drawing, a microwave generator 10 which may be, for example, a Si avalanche, a Ga As avalanche, or a Gunn microwave generator, is placed within a resonant cavity 12 having a slot 14 through which microwaves are beamed. An electric power source 16 applies electric power through a current-limiting resistor 18 to cause microwaves 20 to be generated by the microwave generator 10. The microwave generator 10 and the resonant cavity 12 are positioned so as to beam the microwaves 20 through the slot 14 so as to strike the periphery 22 of a disc 23 and a series of grooves 24 therein and be reflected therefrom. The reflected microwaves 25 are detected by a microwave detector 26 which may be, for example, a Si rectifier detector placed within a resonant cavity 28 having a slot 30 through which the reflected microwaves 25 pass to the microwave detector 26. The disc 23 is suitably secured to an input shaft 32 for rotation therewith.

The series of grooves 24 are filled with a material 36 through which microwaves will pass such as plastic so as to prevent dirt buildup in the grooves 24. It is understood that the material 36 is not necessary for the operation of the rotation member speed sensor. The spacing between the periphery 22 and the microwave generator 10 and the microwave detector 26 is not critical and may be as close as desired or in the order of inches. The primary limiting factor is the distance at which the microwave detector 26 can detect the reflected microwaves 25.

The microwave detector 26 is connected to a utilization circuit 38. The utilization circuit 38 is comprised of an amplifier 40, connected so as to receive the output of the microwave detector 26, a squaring amplifier 42, a differentiator 44, a rectifier 46, a monostable multivibrator 48, an amplifier 50 having a feedback capacitor 52 and a feedback resistor 54 and an indicator 56 suitably calibrated so as to indicate the speed of rotation of the disc 23.

When the disc 23 is not rotating, the distance through which the beamed microwaves 20 travel before striking the periphery 22 or the grooves 24 is constant and the reflected microwaves 25 have a constant amplitude as detected by the microwave detector 26. Therefore, the reflected microwaves 25 as sensed by the microwave detector 26 produce no output from the amplifier 40 since the amplifier 40 will not respond to the frequency of the generated microwaves 20 due to its limited frequency response. Therefore, there will be no input to the indicator 56 with the result that the indicator 56 will indicate a zero speed of rotation of the disc 23. As the disc 23 is rotated by the input shaft 32, the distance through which the beamed microwaves 20 and the reflected microwaves 25 must pass before reaching the detector 26 varies with time as a result of the movement of the periphery 22 and the grooves 24 therein. Since the amplitude of the reflected microwaves 25 as detected by the microwave detector 26 is a function of the distance through which the microwaves must travel, the generated microwaves 20 are in effect amplitude modulated by the rotation of the disc 23 as a result of the variance in the distance that the microwaves 20 must travel due to the periphery 22 and the grooves 24 therein. As can be seen, the frequency at which the generated microwaves 20 are modulated corresponds to the rate at which the disc 23 is rotated. For example, a disc having 96 grooves around its periphery and rotating at 498 r.p.m. will amplitude modulate the microwaves at a frequency of 797 Hz. The generated microwaves 20 as reflected and modulated by the rotation of the disc 23 are detected by the microwave detector 26 which produces an output signal having a frequency of modulation corresponding to the speed of rotation of the disc 23. The amplitude of the output signal is independent of the speed of rotation of the disc 23 since the amplitude of the reflected microwaves 25 as detected by the microwave detector 26 is primarily dependent on the distance the generated microwaves 20 must travel. This signal is amplified by the amplifier 40 which produces an output signal having a frequency corresponding to the frequency of modulation of the reflected microwaves 25. This signal is squared by the squaring amplifier 42 whose square wave output is differentiated by the differentiator 44 to produce positive and negative going pulses which are rectified by the rectifier 46 to produce positive going pulses having a frequency corresponding to the frequency of modulation of the reflected microwaves 25. These positive going pulses trigger the monostable multivibrator 48 to produce a series of pulses having equal amplitude and width. The amplifier 50 with its feedback capacitor 52 and the feedback resistor 54 receives the output pulses from the monostable multivibrator 48 and generates a direct current signal having an amplitude corresponding to the frequency of the pulse input and therefore the frequency of modulation of the reflected microwaves 25. This signal drives the indicator 56 so as to indicate the speed of rotation of the disc 23.

Although the foregoing description utilizes a separate microwave generator and a microwave detector, a microwave generator operating in a self-detecting mode may be utilized. In addition, the utilization circuit 38 is not limited to indicating the speed of rotation of a rotating member but may consist of, for example, a speed control circuit or a vehicle wheel lock control system.

What has been described is a rotating member speed sensor utilizing microwaves in which the amplitude of the output signal is independent of speed and in which the spacing between the rotating member speed sensor and the rotating member is not critical.

We Claim:

1. A rotating member speed sensor comprising, in combination, microwave reflecting disc means connected to the rotating member for rotation therewith, the disc means having a series of grooves spaced around the periphery thereof, the grooves being filled with a microwave transparent material for preventing foreign matter buildup therein; microwave-generating means located adjacent to the disc for transmitting a continuous microwave signal toward the periphery of the disc so as to be reflected therefrom; microwave-detecing means located adjacent to the disc for detecting the reflected microwave signal, the detected microwave signal having an amplitude which varies in an inverse relationship to the distance the microwave signal travels between the microwave-generating means and the periphery and between the periphery and the microwave-detecting means, whereby the detected microwave signal is amplitude modulated by the grooves in the periphery of the disc due to the cyclic variation in the distance the microwave signal travels between the microwave-generating means and the periphery and between the periphery and the microwave-detecting means when the disc is rotated, the frequency of the modulation being determined by the number of grooves in the periphery of the disc and the angular velocity of the rotating member; demodulator means for generating an output signal having a frequency equal to the frequency of modulation of the detected microwave signal, the demodulator means including the microwave-detecting means; and indicator means for indicating the angular velocity of the rotating member in response to the frequency of the output signal of the demodulator means.